US007448548B1

(12) United States Patent
Compton

(10) Patent No.: US 7,448,548 B1
(45) Date of Patent: Nov. 11, 2008

(54) PULSED WIRELESS DIRECTIONAL OBJECT COUNTER

(75) Inventor: John I. Compton, Lexington, KY (US)

(73) Assignee: Point Six Wireless, LLC, Lexington, KY (US)

( * ) Notice: Subject to any disclaimer, the term of this patent is extended or adjusted under 35 U.S.C. 154(b) by 293 days.

(21) Appl. No.: 11/331,603

(22) Filed: Jan. 13, 2006

(51) Int. Cl.
*G06K 7/00* (2006.01)

(52) U.S. Cl. ........................ 235/440; 235/385; 235/454; 235/382; 235/384

(58) Field of Classification Search ................. 235/440, 235/385, 454, 382, 384
See application file for complete search history.

(56) References Cited

U.S. PATENT DOCUMENTS 4,874,063 A * 10/1989 Taylor ........................ 187/391
5,519,784 A * 5/1996 Vermeulen et al. .......... 382/100
6,712,269 B1 * 3/2004 Watkins ...................... 235/385
2003/0179127 A1 * 9/2003 Wienand ..................... 342/28

* cited by examiner

*Primary Examiner*—Michael G. Lee
*Assistant Examiner*—Kristy A Haupt
(74) *Attorney, Agent, or Firm*—Wood, Herron & Evans, LLP

(57) ABSTRACT

A directional object counter uses two or more light sources to generate pulses of light, which travel on two light paths across a passageway. Light from both sources illuminates two sensors, after the light has traversed the passageway, and a processor connected to the sensors determines, based on the pulsed nature of the sources, which source(s) is/are illuminating which sensor(s), and counts movement of objects through the light paths in an identified direction. The pulsed nature of the light permits low-power operation of the directional object counter with a battery. Furthermore, the independence of the pulse discrimination from the pulse generation, enables the light sources and light sensors to be positioned on opposite sides of a passageway without wiring connecting them across the passageway.

29 Claims, 5 Drawing Sheets

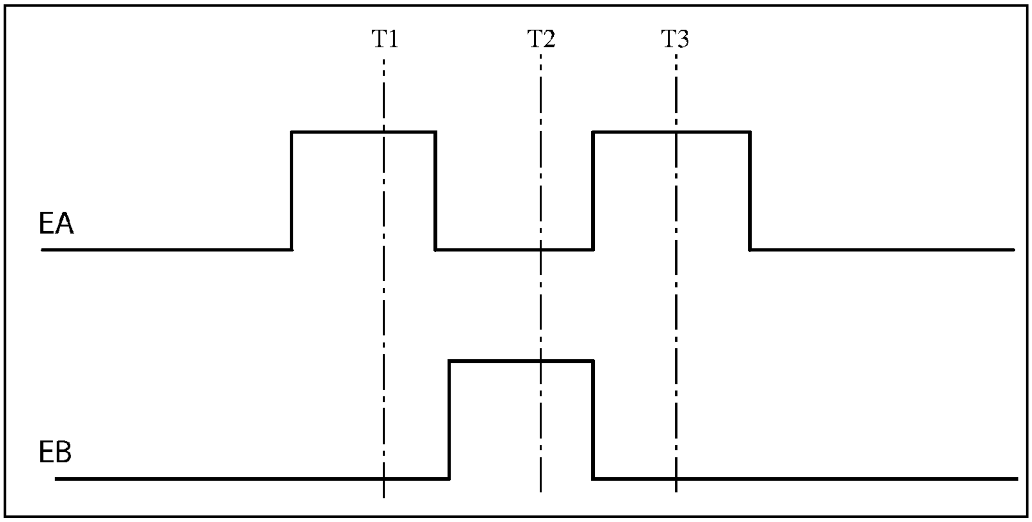

FIG. 3

| | EA | EB | 1 | 2 | 3 | Output | |
|---|---|---|---|---|---|---|---|
| SA | Visible | Visible | X | X | X | 1 | (Fig. 3A) |
| SB | Visible | Visible | X | X | X | 1 | |
| SA | Visible | Visible | X | X | X | 1 | (Fig. 3B) |
| SB | Visible | Blocked | X | | X | 0 | |
| SA | Visible | Visible | X | X | X | 1 | (Fig. 3C) |
| SB | Blocked | Blocked | | | | 0 | |
| SA | Visible | Blocked | X | | X | 1 | (Fig. 3D) |
| SB | Blocked | Blocked | | | | 0 | |
| SA | Blocked | Blocked | | | | 0 | (Fig. 3E) |
| SB | Blocked | Blocked | | | | 0 | |
| SA | Blocked | Blocked | | | | 0 | (Fig. 3F) |
| SB | Blocked | Visible | | X | | 1 | |
| SA | Blocked | Blocked | | | | 0 | (Fig. 3G) |
| SB | Visible | Visible | X | X | X | 1 | |
| SA | Blocked | Visible | | X | | 0 | (Fig. 3H) |
| SB | Visible | Visible | X | X | X | 1 | |

| | EA | EB | 1 | 2 | 3 | Output |
|---|---|---|---|---|---|---|
| SA | Blocked | Visible | | X | | 0 |
| SB | Visible | Blocked | X | | X | 0 |
| SA | Blocked | Visible | | X | | 0 |
| SB | Blocked | Visible | | X | | 1 |
| SA | Blocked | Visible | | X | | 0 |
| SB | Blocked | Blocked | | | | 0 |
| SA | Visible | Blocked | X | | X | 1 |
| SB | Visible | Visible | X | X | X | 1 |
| SA | Visible | Blocked | X | | X | 1 |
| SB | Visible | Blocked | X | | X | 0 |
| SA | Visible | Blocked | X | | X | 1 |
| SB | Blocked | Visible | | X | | 1 |
| SA | Visible | Visible | X | X | X | 1 |
| SB | Blocked | Visible | | X | | 1 |
| SA | Blocked | Blocked | | | | 0 |
| SB | Visible | Blocked | X | | X | 0 |

FIG. 4

PULSED WIRELESS DIRECTIONAL OBJECT COUNTER

FIELD OF THE INVENTION

The present invention relates to the counting of traffic such as people using light beams.

BACKGROUND OF THE INVENTION

The problem of counting people traffic with beams of light is known. Typically, people counters are used at doorways in places of public accommodation such as stores and other buildings to roughly count occupancy and correspondingly control ventilation, heating and air conditioning systems. People counts have other purposes as well; in retail establishments, people counters may be used in store aisles or other locations to determine interest in those particular areas, and may be used to generate statistics such as total traffic through a store or particular aisle, and to perform data mining when combined with other data, e.g., by using register transaction counts to test the efficiency with which sales are being consummated from visiting potential customers in the store or particular aisles.

The most common approach to people counting has been to produce a light beam across a passageway, to count the number of persons passing through the passageway, represented by the number of times the light beam is broken.

A battery powered people counting system that uses this broken-beam approach is described in U.S. patent application Ser. No. 10/635,403, filed by the applicant hereof. This patent application describes an object counter that uses an infrared (IR) light source that generates and detects brief pulses, using very fast emitter/sensor devices and reducing the data cycle to approximately 20 microsecond of IR emission for every 1/16-second operation. This is a power on-to-off ratio of approximately 1 to 300, permitting low power consumption and long-term battery-powered operation. The applicant's U.S. Pat. No. 6,721,546, which is hereby incorporated herein by reference, describes additional low-power techniques that use a processor for a brief period of time.

Single-beam people counters such as disclosed in the above patent, can readily track a beam break, but cannot readily determine the direction of movement of an object or a person that caused the beam break. When counting movements through separate entrance and exit doors in a building, the location of the beam indicates whether the person is entering or exiting. However, when monitoring a passageway that is bi-directional, or where a common door is used for entry and exit, a single beam is not typically able to discriminate between the entry of a person and the exit of a person. For such applications, therefore, it has been known to use a directional people counter.

Directional people counters a retro-reflective target and two narrow beam emitter/sensor assemblies to produce two physically separated beams. The beams must be narrow enough such that the two sensors do not see each other's beams as they are reflected back from the retro-reflective target. Referring to FIG. 1A, the physical arrangement of the beams in a typical prior art two-beam counting system 10 can be explained. The beams A and B from emitters EA and EB are launched across the entranceway 12 toward a retro-reflective target 14. The beams reflect from the target 14 and back toward the system 10 and sensors SA and SB positioned therein. (In FIGS. 1A and 1B, the scale of the distance between the emitters is exaggerated relative to the scale of the distance across the passageway being monitored.)

It is necessary in these typical directional object counting systems, that the emitted beam from the emitters EA and EB be sufficiently narrowly focused that, when mirror 14 is properly positioned, the respective beams A and B from EA and EB will illuminate only one of the corresponding sensors SA and SB. Thus, the shaded area in FIG. 1A, representing the region illuminated by beam B from EB, does not include sensor SA. Also, the unshaded area in FIG. 1A, representing the region illuminated by beam A from EA, does not include sensor SB. Similarly, the field of view of the sensors must be sufficiently narrow to exclude stray light emitted from the opposite emitter. Only when this condition is met will sensor SA and sensor SB working with emitters EA and EB create independent beams A and B across the passageway, which reflect the existence or absence of an object in two different regions of the passageway 12. When a person or object passes in direction 16, the object/person will break beam A first, which will cause a loss of signal at sensor SA, and then bream beam B, causing a loss of signal at sensor SB. Conversely, when a person or object passes in direction 18, beam B will break first, causing a loss of signal at sensor SB, and then beam A will break, causing a loss of signal at sensor SA.

Directional people counters thus detect direction of motion by the sequence in which beams are broken and signal lost at sensors. If direction 16 is the direction of entry and direction 18 is the direction of exit, then a break of beam 16 first means an entry, and a break of beam 18 first means an exit.

It will be noted that this method of dual-beam people counting requires optically precise emitters EA and EB, that emit a beam with a relatively narrow aperture angle $\alpha$, and optically narrow field of view sensors, so that the field of view of sensor SA cannot see stray light from emitter EB emitter and the field of view of sensor SB cannot see stray light from emitter EA. If the field of view and aperture angle $\alpha$ of the sensor and emitter are excessively large for the application, then the beams A and B returning to sensors SA and SB will activate both sensors, as shown in FIG. 1B.

Typically the width of the passageway is several feet and the emitter-sensor center-to-center separation is only a few inches. As a result an emitter beam divergence of far less than 30 degrees would result in both sensors having a view of both emitters. In this circumstance, the signals received at the sensors SA and SB will be a function of the signals transmitted from both emitters EA and EB, and as a result, both beams EA and EB must be broken before either sensor will lose signal. Thus sensors SA and SB will lose signal simultaneously or nearly so, and only when both beams are broken, and it will be difficult to determine the direction of motion because the beam are not clearly and unambiguously broken at different times, as is the case when the beams have a sufficiently narrow aperture angle as shown in FIG. 1A.

The reason that the beam generating/sensing assemblies EA/SA and EB/SB are separated by only a few inches is that a smaller package is the better for object counting applications, as object counters are typically mounted on door frames and walls. Thus, the emitter-sensor separation, and the width of the passageway being monitored, are relatively fixed. As a result, beam emitter/sensor assemblies must have particularly narrow beams and fields of view for such applications. This means the beam generating and sensing assemblies are optically precise and complex in design, with a lens and collimator required to produce the small viewing angle necessary so that the sensors SA and SB do not see the beam from the opposite emitter EB and EA. These precision optics result in a high manufacturing cost.

The need for a narrow field of view sensor also increases power requirements on the IR emitter. The power emitted by the IR emitter, combined with the sensitivity of the IR sensor, determine the sensing range of the assembly. The more IR power emitted, the greater the range will be for a given IR emitter sensitivity. However, the requirements of a retro-reflective dual beam directional object counter, require sensors with a narrow field of view and a consequently lower sensor sensitivity. That lower sensitivity of the sensor, must be compensated by a higher power IR emitter to achieve a desired sensing range. The power required to operate such a system is typically too high for battery powered operation for reasonably long periods. As a result, wires must be used to supply electrical power to the beam counting system, and to communicate beam break sequence data to a location where it can be incorporated into a higher-level application such as retail traffic monitoring. Wiring costs are high in many installations and often contribute more to overall cost than the beam sensor.

It is an object of the present invention to provide an accurate directional people counting system that does not require precise optics and the attendant expense therefor, and which can operate on battery power for suitably long periods of time thus eliminating the need for wiring to a central location.

SUMMARY OF THE INVENTION

In accordance with principles of the present invention, these objects are met by a directional object counter that uses two or more light sources to generate light paths, and one or more sensors to detect the light, in which the light sensor receives light from both sources. Although both light sources illuminate the sensor, the manner in which the illumination is performed permits a processor connected to the sensor to determine whether the first source is or is not illuminating said light sensor, independently of whether the second source is illuminating the sensor. Thus, the processor can count movement of an object through the light paths in an identified direction based upon those determinations.

In the disclosed specific embodiment, there are two light sensors, and the processor separately determines whether the first light source is illuminating the first light sensor and whether the second light source is illuminating the second light sensor, to establish two separate light paths, so that movement of an object through those light paths can be counted, by detecting blockage of one light path and then the other, followed restoration of the light paths.

In this particular embodiment, the light sources generate light pulses, and the processor detects whether a light source is illuminating the light sensor based upon the reception, or lack thereof, of the pulses. The pulses used in the specific embodiment described herein are a pulse generated by the first light source, followed by a pulse generated by the second light source, followed by a pulse generated by the first light source. With pulses formatted this way, the processor can detect that light generated by the first light source is illuminating the light sensor based upon the receipt of a light pulse followed by a light pulse two pulse widths later, and can detect that light generated by the second light source is illuminating the light sensor based upon the receipt of a light pulse followed by a light pulse one pulse width later, or based upon the receipt of a light pulse not followed by a light pulse two pulse widths later.

Other pulse-based discriminations are also possible. For example, the light pulses can comprise a long pulse generated by the first light source, and a short pulse generated by said the second light source. In this case the processor can determine that the first light source is illuminating a sensor based upon the receipt of a light pulse that continues for a time longer than the short pulse, and the processor can determines that the second light source is illuminating said sensor based upon the receipt of a light pulse that continues longer than the long pulse, or a light pulse that continues for a time longer than the short pulse but shorter than the long pulse.

The specific embodiment described below uses infrared light, but other forms of directional radiant energy may also be used.

The invention permits low-power operation of a directional object counter, sufficiently low power to use a battery as a power source. Although the use of battery power is not required for all aspects of the invention, it is an independent aspect of the invention to provide a battery powered directional object counter.

The low-power operation provided by the invention, combined with the independence of the pulse discrimination from the pulse generation, also enables the light sources and light sensors to be positioned on opposite sides of a passageway without wiring connecting them across the passageway. Although this particular placement is not required for all aspects of the invention, it is an independent aspect of the invention to provide a directional object counter in which the light sources and light sensors are positioned on opposite sides of a passageway, without the use of a wired connection between the sources and sensors.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

FIG. 3 is an illustration of the pulses of light generated by the emitters of the object counter illustrated in FIG. 2;

FIG. 4 is an illustration of the pulses received in the operating conditions shown in FIGS. 3A-3H and other operating conditions;

DETAILED DESCRIPTION OF SPECIFIC EMBODIMENTS

As elaborated in the above-referenced patent application filed by the applicant hereof, a single beam object counting device, operating in a pulsed fashion, with an off/on ratio of 300, has a small enough average power supply current that a reasonably small battery can provide the required operating power for the device for multiple years. This pulse operation method is uniquely modified herein for use in a dual beam, directional object counter.

The specific implementation of this pulse operation has the unexpected positive consequence of permitting relaxation of the design requirements for the emitters and sensors in a dual-emitter directional object counter. In particular, the aperture angle of the emitters and field of view of the sensors may be wider than is permitted in conventional designs, such that both emitter beams arrive at and are within the field of view of both sensors, which is the condition discussed above referencing FIG. 1B. Such a configuration has been avoided in the prior art, because it hampers directional sensitivity; however, using a pulsed approach according to the present invention permits the use of such configurations without loss of directional information.

Figure 2:
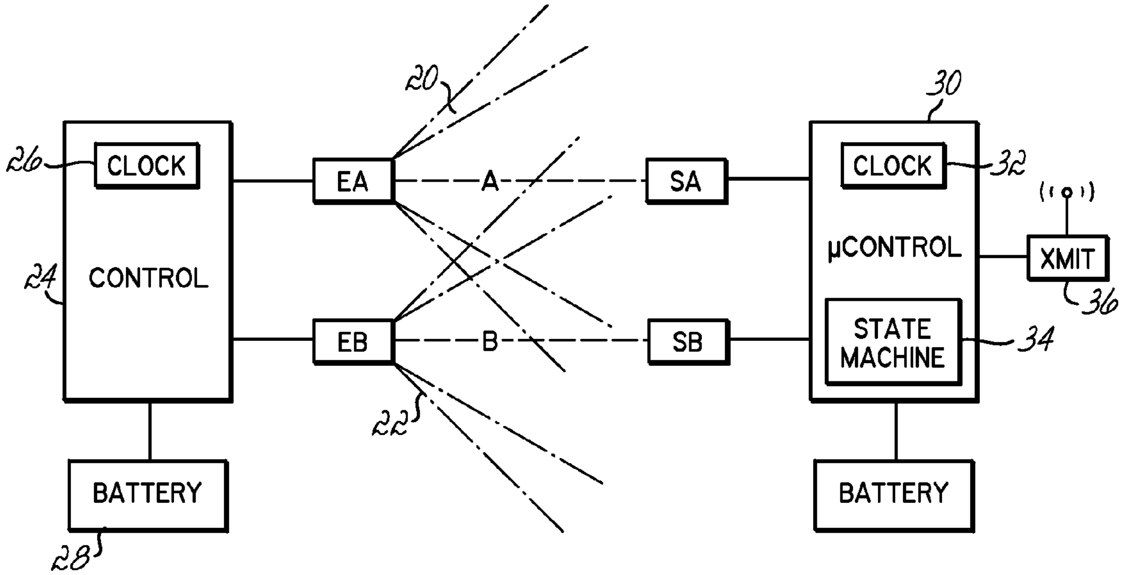
FIG. 2 is an illustration of a low power, directional object counter according to principles of the present invention.

Specifically, as illustrated in FIG. 2, in accordance with principles of the present invention, emitters EA and EB are configured on one side of a passageway, and sensors SA and SB on the other side of the passageway. Emitters EA and EB emit beams 20 and 22 which, in a typical configuration, will both illuminate both of sensors SA and SB.

Figure 1A:
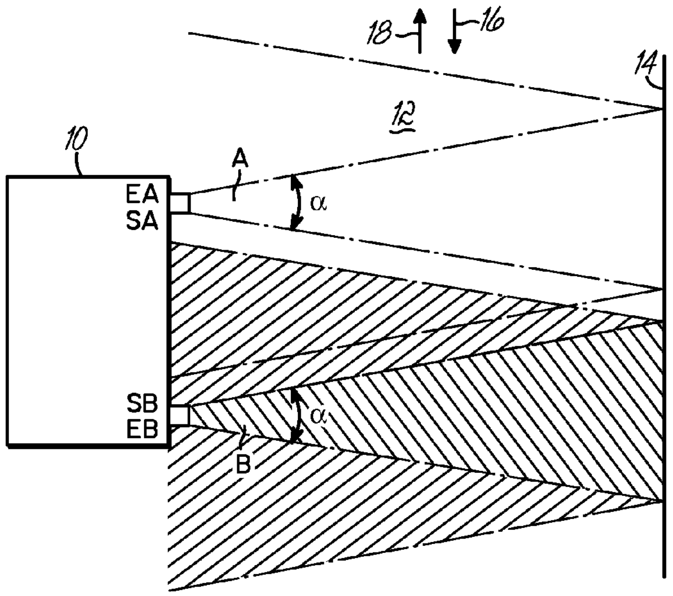
FIG. 1A PRIOR ART
FIG. 1A is an illustration of a prior art directional object counter.
Figure 1B:
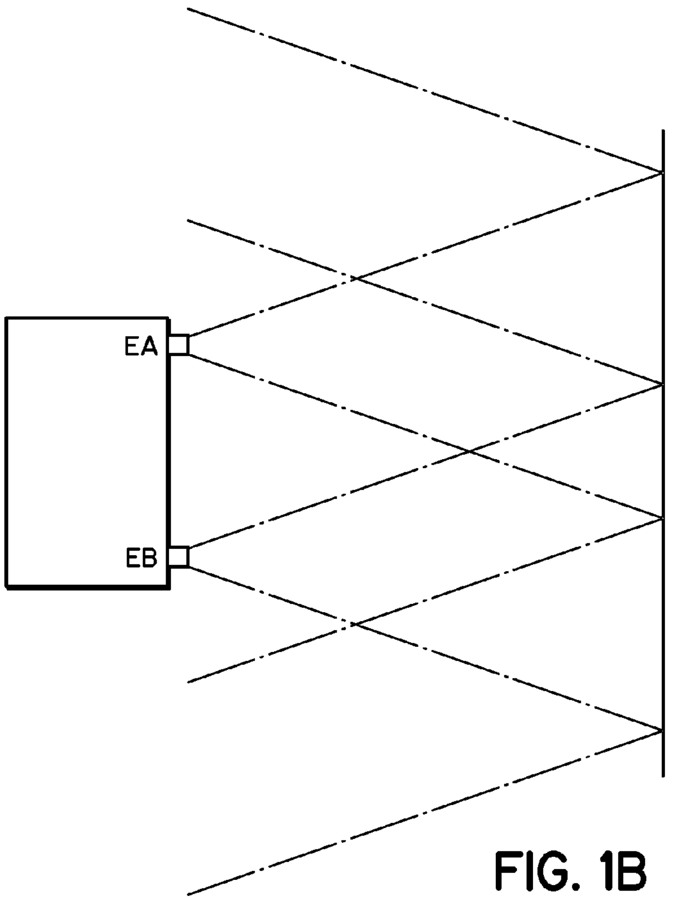
FIG. 1B is an illustration of such an object counter when misconfigured so that light from both emitters is visible to both sensors.

It will be noted that the emitters EA, EB and the sensors SA, SB are located on opposite sides of the passageway, as opposed to being co-located on the same side of a passageway and opposed by a mirror on the opposite side of the passageway as is the case in the prior art systems illustrated in FIGS. 1A and 1B. It will be appreciated that the present invention permits operation of the emitters and sensors on opposite sides of a passageway, for the reason that the emitters and sensors operate wirelessly and on battery power, and because there is no need for relative timing information to be transferred from the emitters to the sensors, or vice-versa. This is advantageous in that can simplify the process of alignment of the emitters and sensors, and it halves total distance traveled by IR light from an emitter to a sensor for a given passageway width, thus reducing the emitted power required by the system.

Emitters EA and EB are electrically controlled by a control circuit 24, which utilizes a clock 26 to periodically generate pulsed emissions from emitters EA and EB, in a manner to be discussed below. Control circuit 24 is thus a low-power circuit utilizing pulsed transmission principles such as are disclosed in the above referenced patent application, and may be operated for long periods of time on battery power from a battery 28.

Sensors SA and SB are similarly electrically controlled by a controller 30, which utilizes a clock 32 to periodically "wake up" the sensors and attempt to detect pulses transmitted from emitters EA and EB. As described in the above-referenced patent application, clock 32 enables sensors SA and SB on a periodic basis with a period that is slightly shorter than the period between transmissions from emitters EA and EB established by clock 26. Thus, sensors SA and SB will "wake up" just prior to an expected pulse transmission from emitters EA and EB. If pulses are detected during the brief "wake up" period of sensors SA and SB established by clock 32, then sensors SA and SB will remain enabled for a period sufficient to capture the transmitted pulses, and boolean variables in controller 30 (herein identified as A and B) will be set to reflect whether beams A and B are broken or unbroken based upon the pulses captured by sensors SA and SB.

On a periodic basis, clock 32 will "wake up" state machine 34 of the controller 30, which will invoke a pass through logical steps (detailed below with reference to FIG. 5), responsive to the values of the variables A and B, and determine whether an object movement should be counted.

On a periodic basis, the resulting object/people counts will be transmitted, preferably wirelessly by a wireless transmitter 36, to a remote data collection system.

As a consequence of the periodic nature of these various functions of controller 30 and transmitter 36, as explained in the above-referenced patent application, control circuit 30 and wireless transmitter 36 are low-power circuits due to their use of low duty cycle operation, and may be operated for long periods of time on battery power.

As illustrated in FIG. 3, control circuit 24 pulses emitters EA and EB in a cadence relative to each other. Specifically, this can be done by first pulsing emitter EA for 20 microseconds to produce a pulse EA1, then pulsing emitter EB for 20 microseconds to produce a pulse EB2, and then pulsing emitter EA for 20 microseconds to produce a pulse EB3. This cadence is repeated once for each measurement cycle. The cadence of pulses EA1, EB2 and EA3 permits the sensors to detect a broken beam, and distinguish whether one or both beams are broken, as elaborated below.

This three pulse cadence permits sensors SA and SB to determine whether a beam is broken, and identify the broken beam, as follows. When either sensor receives a pulse during a "wake up" period of controller 30, then the controller 30 determines whether that pulse is followed by a second pulse received at either sensor, and then by a third pulse received at either sensor.

In the event a sensor receives a pulse followed by two subsequent pulses, then the sensor must be receiving beams A and B from both emitters EA and EB. In the event the sensor receives no second pulse but receives a third pulse, then the sensor must be receiving beam A from emitter EA but beam B from emitter EB is blocked. In the event the sensor receives a first pulse but no second or third pulses, then the sensor must be receiving beam B from emitter EB while beam A from emitter EA is blocked.

A technique of generating three pulses, first from EA then from EB then from EA again, thus permits each sensor to discriminate between receiving either or both emitter beams. The collection of data can thus proceed. For ease of reference, these three pulses will be identified hereafter as EA1, EB2 and EA3.

For an implementation of this scheme, a pulse width was chosen to be 40 microseconds. This width was chosen to allow for detection flutter. In order to synchronize the sensor side to the emitter, a detection process starts whenever either sensor senses a pulse during a "wake up" period of controller 30. The first detected pulse may be any one of the three pulses, i.e., it may be EA1 or EA3 from EA, or EA2 from EB. When a first pulse is detected by either sensor, three measurements of the IR sensor data SA and SB are made at three times relative to the first detected pulse. As illustrated in FIG. 3, these measurements are made at T1, T2, and T3 after the first detected pulse, where T1 is 20 microseconds after first detection, T2 is 60 microseconds after the first detection and T3 is 100 microseconds after the first detection. After all measurements at times T1, T2, T3 are made, the results are analyzed to determine which paths EA-SA or EB-SB are currently present. This state information is fed into a state machine what determines the sequence of the beam breakage and the direction of traffic.

In the event the first detected pulse the first pulse from emitter EA, EA1, then T1, T2 and T3 will occur as shown in FIG. 2. However, if only the EB sensor is in view of either sensor SA or SB, the 40 microsecond pulse from EB may start the measurement cycle, and in this case T1 will occur during EB2, T2 during EA3, and T3 after EA3 is completed, in which case signal will be detected only at T1 (due to the shortness of the pulses it is unlikely that any object's motion will unblock emitter EA during the 40 microseconds between EA1 and EA3).

It will follow therefore, that any time a signal is present at T1 and T3 the corresponding sensor is in view of emitter EA.

For the purposes of monitoring traffic flow, the case of interest is whether sensor SA is exposed to emitter EA, so the reception state of sensor SA is checked only at times T1 and T3, and only if reception occurs at times T1 and T3, sensor SA is determined to be receiving an unbroken beam from emitter EA.

The logic for determining if sensor SB has a view of EB, accounts for two possibilities, the first being that pulse EA1 starts the T1, T2, T3 read cycle, and the second being that pulse EB1 starts the read cycle. When emitter EA is illuminating sensor SB, pulse EA1 starts the measurement sequence, and EB2 will be viewed by SB at T2. When emitter EA is blocked from illuminating sensor SB, and EB2 will starts the T1, T2, T3 measurement sequence, and EB2 will be viewed by SB at T1, but there will be no signal at T3, that is, there will be a signal at time T1 and there will not be a signal at T3. Using this logic, it is possible to determine beam status for beam B between EB and SB, as follows: if there is signal at time T2, or there is signal at time T1 but not at time T3, then sensor SB is determined to be receiving an unbroken beam from emitter EB.

Figure 3A:
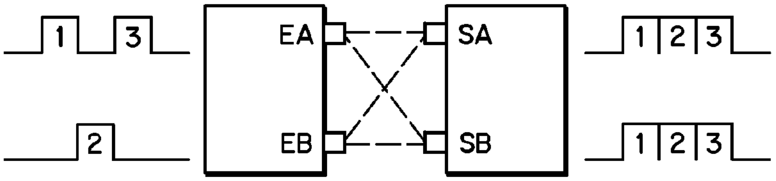
FIGS. 3A, 3B, 3C, 3D, 3E, 3F, 3G and 3H are illustrations of the pulses received at the sensors of the object counter illustrated in FIG. 2 under various operating conditions.
Figure 3B:
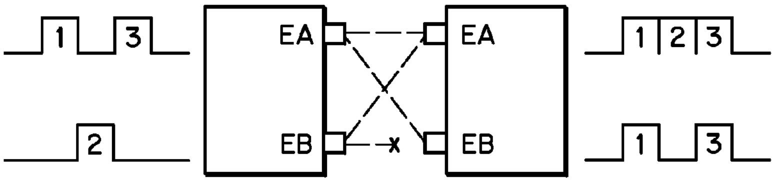
Figure 3C:
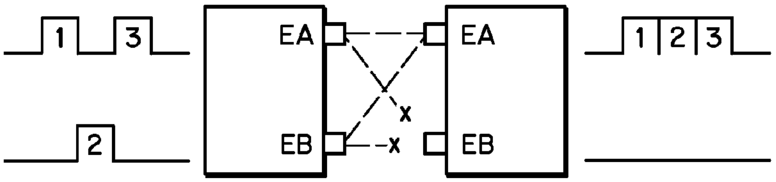
Figure 3D:
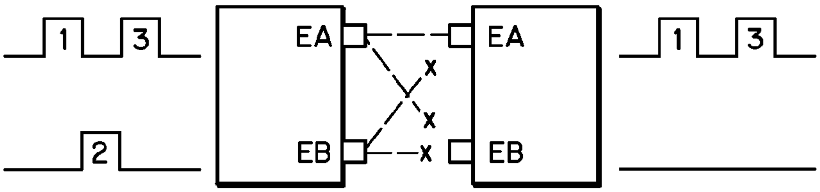
Figure 3E:
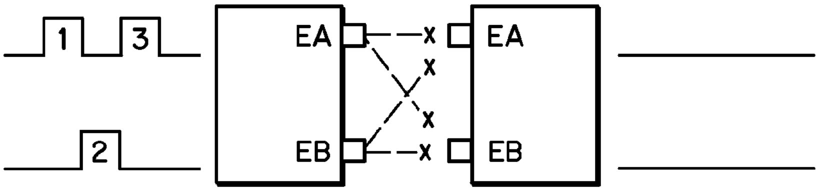
Figure 3F:
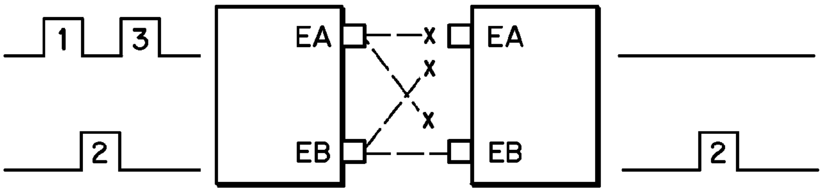
Figure 3G:
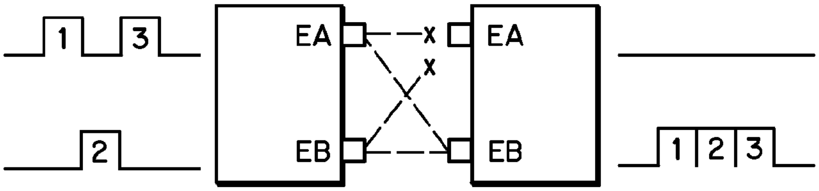
Figure 3H:
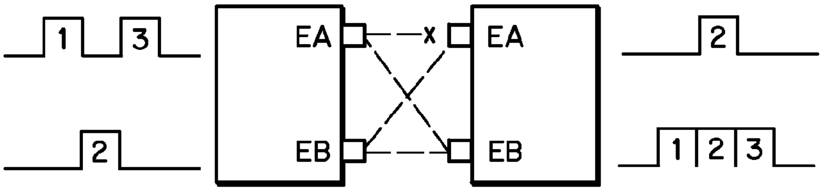

FIGS. 3A-3H illustrate the typical sequence in which pulses are received by sensors SA and SB as an object passes through a monitoring point in a passageway. FIG. 3A illustrates a condition where both beams A and B are unblocked, and sensors SA and SB each receive pulses EA1, EB2 and EA3. FIG. 3B illustrates a case where beam B is blocked from sensor SB, as part of an object passing in direction 18 through the passageway, and shows that pulses EA1, EB2 and EA3 are received at sensor SA but only pulses EA1 and EA3 are received at sensor SB. FIG. 3B illustrates a case where beams A and B are both blocked from sensor SB as the object continues into the passageway, and shows that pulses are received only at sensor SA. FIG. 3D illustrates a case where beams A and B are blocked from sensor SB and beam B is also blocked from sensor SA, and the pulses received at sensor SA in this case. FIG. 3E illustrates the case where all beams are blocked as the object is fully within the passageway, in which case no pulses are received. FIG. 3F illustrates the object beginning to leave the passageway, such that beam B becomes unblocked from sensor SB and only pulse EB2 is received by sensor SB. In FIG. 3G, beams A and B are unblocked from sensor B, which receives pulse EA1, EB2 and EA3, but no pulses are received at sensor SA. In FIG. 3H, beam B is unblocked from sensor A, and it begins to receive pulse EB2. Finally, when the object has fully departed, beams A and B will be unblocked and the FIG. 3A illustration will govern and pulses EA1, EB2 and EA3 are received at both sensors.

Each of FIGS. 3A-3H illustrate which of the pulses are received in each case of beam interruption. Controller 30 (FIG. 2) applies the logic identified above, namely;

Beam A is unbroken when signal is received at SA at time T1 and T3, and

Beam B is unbroken when signal is received at SB at time T2, or when signal is received at SB at time T1 but not T3, to determine whether beam A or beam B are to be considered broken or unbroken. Applying the logic identified above to the cases illustrated in FIGS. 3A-3H, one can readily see that Beam A will correctly be considered unbroken in FIGS. 3A, 3B, 3C and 3D, and broken in FIGS. 3E (no pulse), 3F (no pulse), 3G (no pulse) and 3H (pulse at T2 only), and that Beam B will correctly be considered unbroken in FIGS. 3A (pulse at T1 not T3), 3F (pulse at T2), 3G (pulse at T2) and 3H (pulse at T2), and broken in FIGS. 3B (no T2, T1 and T3), 3C (no pulse), 3D (no pulse), and 3E (no pulse).

It will be appreciated that the particular combinations of beam breaks illustrated in FIGS. 3A-3H may not all occur in a particular environment, and furthermore, other combinations may occur. For example, the cross-illumination of SA by EB and SB by EA may be broken simultaneously with the direct illumination of SA by EA and SB by EB. Also, small items such as airborne paper scraps or stray reflections may cause breaks in illumination that are not consistent with the movement of a large object through the beams.

The table of FIG. 4 illustrates possible combinations of beam visibility or blockage in which pulses may be received at sensors SA and SB. For each case, FIG. 4 also identifies the output that will be generated by controller 30 in response to the pulses received. It will be noted from this table that the controller 30 will correctly determine, based on the logic rules noted above, whether the beams A and B are broken or unbroken; wherever EA is visible to SA, beam A is considered unbroken and vice versa, and wherever EB is visible to SB, beam B is considered unbroken and vice versa.

Having thus established that the arrangement described above accurately reflects, for two cross-illuminating beams, which of the beams is broken and unbroken, focus may now turn on the logic for determining whether a particular sequence of beam breaks should be considered an entry or exit from a passageway.

Figure 5:
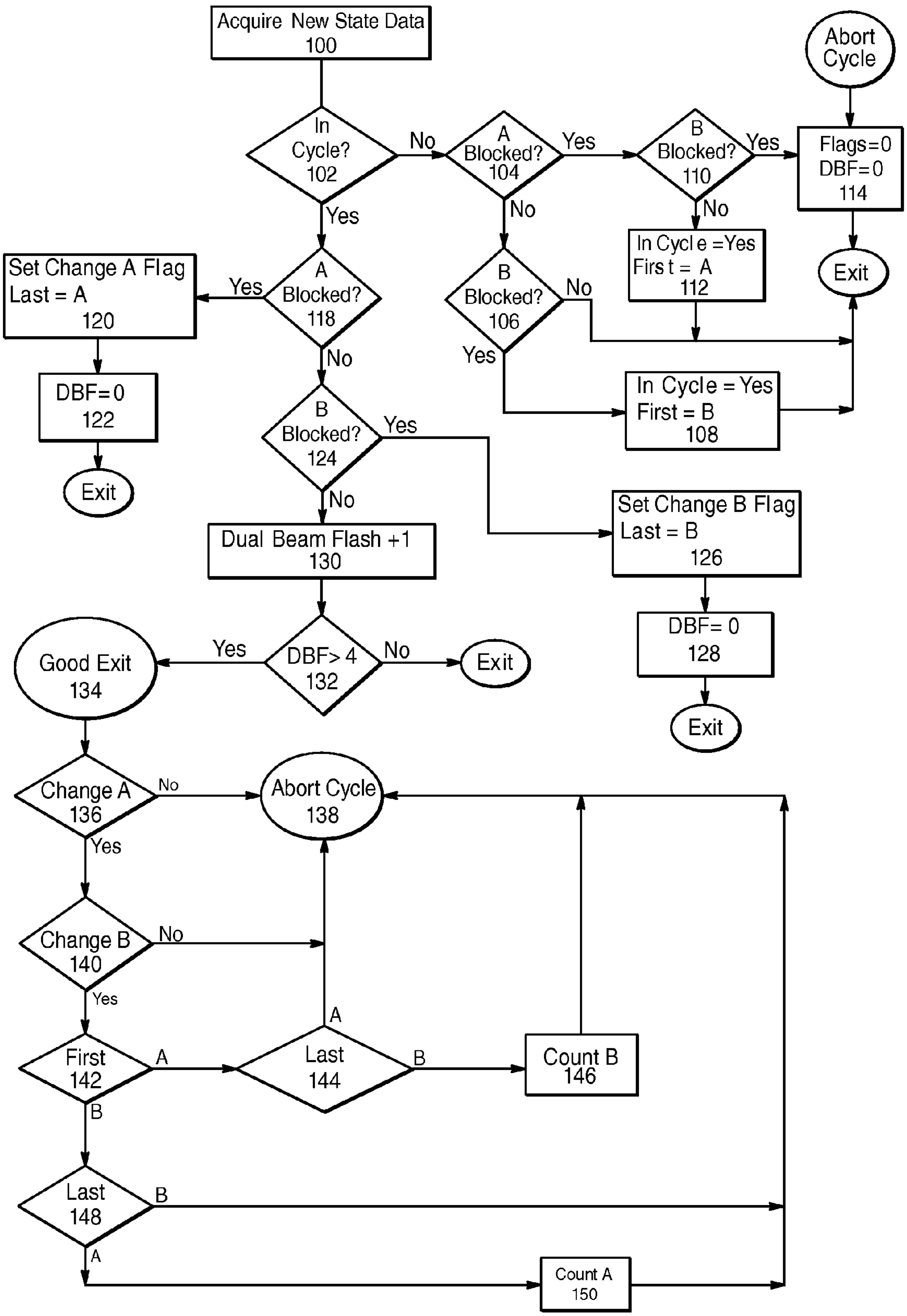
FIG. 5 is a flow chart of the operations performed by the sensor controller of the object counter illustrated in FIG. 2.

FIG. 5 is a flow chart of the logical steps of the state machine of controller 30, which determine whether an entry or exit event is considered to have occurred, based upon the states of Beam A and Beam B (broken or unbroken) as observed during passes through the state machine. As noted above, pulses are transmitted periodically by emitters EA and EB and sensors SA and SB are periodically enabled, at a time prior to an expected next transmission, to receive the transmitted pulses. When pulses are received, variables A and B are set for use by the FIG. 5 state machine, to indicate whether beam A and beam B are visible or blocked.

In a pass through the state machine of FIG. 5, the variables A and B indicating the current condition of beams A and B are read, are used to establish whether an entry/exit count should be made.

The state machine of FIG. 5 utilizes eight flags/variables. These are:

A: boolean (yes/no) variable—indicates beam A was blocked during the last "wake up" cycle of sensors SA and SB.

B: boolean variable—indicates beam B was blocked during the last "wake up" cycle of sensors SA and SB.

In Cycle: boolean variable—indicates whether the recent blocked/unblocked activity of beams A and B indicate a "cycle" of activity that is suggestive of an object/person passing through the beams.

Change A: boolean variable indicating whether the A beam has changed condition during the current cycle.

Change B: boolean variable indicating whether the B beam has changed condition curing the current cycle.

First: boolean variable having the values A or B, indicating whether the first beam change detected during the current cycle was blockage of the A beam or blockage of the B beam.

Last: boolean variable having the values A or B, indicating whether the last beam change detected during the current cycle was blockage of the A beam or blockage of the B beam.

DBF: counter used to determine whether an indicated unblocked condition of the A and B beams is genuine or an artifact of spurious radiation and/or reflections.

In a first step 100 of FIG. 5, current beam condition data and state machine variables are acquired. Next, in step 102, the InCycle variable is checked to determine whether a current cycle is in process. Initially, there will not be a cycle in process, and assuming the beams are properly aligned, neither beam will be blocked. In this case, processing will move from step 102 to step 104, where it is determined whether the A variable indicates the A beam is blocked. If the A beam is not blocked, as will be initially the case, then processing moves to step 106 where it is determined whether the B beam is blocked. If the B variable indicates the B beam is not blocked, processing will exit.

If, at some point, an object breaks one of the beams, a cycle will start. For example, if the B beam is blocked while the A beam is unblocked, then processing will go from step 104 to step 106 to step 108, where the InCycle variable will be set to indicate a cycle has commenced, and the First variable will be set to indicate that beam B was broken first. Similarly, if the A beam is blocked while the B beam is unblocked, then processing will go from step 104 to step 110, where it is determined the B beam is unblocked, and then to step 112, where the InCycle variable will be set to indicate a cycle has commenced, and the First variable will be set to indicate that the A beam was broken first. Thereafter, a cycle will have begun and processing will take a different path from step 102.

The logic described above includes inherent error checking. Specifically, if both beams are broken at the same time, this indicates an error condition rather than a trackable object movement. In such a case, processing will move from step 104 through step 110 to step 114, in which all flags and the DBF counter will be cleared. So long as both beams are broken, no cycle will start, but when a beam becomes visible again, as long as only one beam becomes visible, a cycle will start as described in the previous paragraph.

Once a cycle has started as described above, passes through the state machine of FIG. 5 will proceed from step 102 to step 118. In step 118 it is determined whether the A beam is currently blocked. If so, then processing continues to step 120 where the Change A flag is set indicating that a change in the state of the A beam was detected during the current cycle, and the Last flag is set to a value that indicates the A beam was the last beam that changed state. Thereafter the DBF counter is reset in step 122. If, during a cycle, the A beam is not blocked, then processing continues from step 118 to step 124, where the B beam is checked. If the B beam is blocked then processing continues to step 126, where the Change B flag is set indicating that a change in the state of the B beam was detected during the current cycle, and the Last flag is set to a value that indicates the B beam was the last beam that changed state. Thereafter the DBF counter is reset in step 128.

As long as one of the beams is blocked, a cycle will proceed through steps 102-118-120 or 102-118-124-126 as described above, thus verifying in each pass that a beam is still blocked and noting the last beam that was blocked. However, once both beams appear to be visible, processing while in a cycle will pass from step 118 through step 124 to step 130, which increments the DBF (dual beam flash) counter. In step 130, the DBF counter is incremented by one, and then in step 132 the value of the DBF counter is checked. Initially, the DBF counter will have a value of zero (as a result of a reset in one or more of steps 114, 122 or 126), and so DBF will take a value of 1 during the first visit to step 130 of a given cycle. As a result, the first time in a cycle that step 132 is reached, the value of DBF will be less than 4 and the pass through the state machine will end. If the beams remain unblocked, however, in the subsequent passes through the state machine, the DBF counter will be incremented to 2, 3, 4 and 5, and when the DBF counter reaches a value of 5, processing will continue from step 132 to step 134, which is indicative of a “good exit” from a cycle. This sequence ensures that a temporary condition of both beams being apparently visible, which can be caused by spurious radiation and/or reflections, will not cause a false count. Only if both beams are visible for five passes through the state machine, will there be a good exit from a cycle.

Once there is a good exit from a cycle, processing continues from step 134 to steps 136-150 which evaluate whether the detected beam activity in the cycle is indicative of a proper object count.

A first criterion for a countable object movement is that a change has been seen in both the A and B beams. Thus, in step 136 the change A flag is evaluated and if it is not set, the cycle is aborted in step 138 (by proceeding to step 114 and resetting all flags and the DBF counter). Similarly, if the change A flag is set then in step 140 the change B flag is evaluated and if it is not set, the cycle is aborted in step 138. If both A and B have changed during the cycle, then processing continues from step 140 to steps 142-148 where the next criterion is evaluated.

The second criterion for a valid object movement is that the first beam change be different from the last beam change. Thus, in step 142 the First flag is checked. If the First flag indicates that the A beam changed first, then in step 144 the Last flag is checked to determine if the B beam changed last. If not, in step 138 the cycle is aborted, but if the B beam changed last there was a good cycle and in step 146 a B count is made (a B count indicates an object apparently passed through the beams, leaving the B beam last). Similarly, if in step 142 the First flag indicates that the B beam changed first, then in step 148 the Last flag is checked to determine if the A beam changed last. If not, in step 138 the cycle is aborted, but if the A beam changed last there was a good cycle and in step 150 an A count is made (an A count indicates an object apparently passed through the beams, leaving the A beam last).

It will be appreciated from the foregoing that the present invention provides an effective and robust object/people counting function using two pulsed beams that are both detectible by each of two sensors.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art.

For example, it will be noted that the second pulse from emitter EA eliminates ambiguity in cases where both beams are broken, and then one beam A or B is unbroken. Without a second pulse from EA, it would be difficult to determine which beam became unbroken unless the relative timing of the emitted pulses could be determined at the sensor. Such would be readily possible were the emitters and sensors on the same side of the passageway. However, in the embodiment illustrated above, no relative timing information is transferred from the emitters to the sensors, to avoid the need for a common clock for the emitters and sensors, and permit them to be located opposite one another in a passageway. However, an alternative embodiment might transfer relative timing information so as to enable the determination of which pulse is transmitted based upon the timing information.

It would also be possible, using only one pulse per emitter, to determine which of two beams is unbroken beam, from the relative timing of the newly-received pulse and previously detected pulses prior to the beam blockage, but the required timing information may be difficult to maintain during a protracted beam blockage.

Another alternative to producing a third EA pulse, would be to produce IR pulses at EA and EB that are different widths, i.e., "short" and "long", such that from pulse width alone the source, either EA or EB, could be determined. Specifically, if the "long" pulse is transmitted first, receipt of light for a period at least as long as a "long" pulse would indicate that the source generating "long" pulses is unblocked. Receipt of light for a period at least as long as a "short" pulse but not as long as a "long" pulse, or for a period longer than a "long" pulse, would indicate that the source generating "short" pulses is unblocked. (Either the "short" or "long" pulse could be transmitted first in this approach.) This noted, various sources of timing inaccuracy would require a relatively long "long" pulse to reliably discriminate between the "short" and "long" pulse, potentially, the "long" pulse would need to be longer than two "short" pulse widths. Specifically, background IR components for ambient lighting result in pulse-width flutter in the sensed sensor signals SA and SB. This pulse-width flutter is increased by the microprocessor's cycle time for capturing a sample, which would require further differences in the pulse widths of EA and EB. The total energy requirement of the system is directly proportional to the total time that the IR emitters are on each cycle, therefore, it is desirable to reduce the on time of the IR emitters to a minimum. Nevertheless, the use of a "short" and "long" pulse may be an effective alternative approach to using two pulses on one of the emitters, particularly if the "long" pulse can be less than twice the length of the "short" pulse while maintaining reliability, in which case this alternate approach might achieve lower power consumption than the two-pulse approach described herein.

The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A directional object counter, comprising:

first and second light sources generating first and second light paths, at least a first light sensor for detecting light from said light sources after traversing a passageway, said light sensor detecting light from both said first and second light sources and generating a responsive signal, and a processor connected to said light sensor for receiving said responsive signal, determining whether said first source is or is not illuminating said light sensor without the use of a timing reference synchronized to the pulse transmission, and counting the movement of an object through said light paths in an identified direction based upon said determination.

2. The object counter of claim 1 further comprising a second light sensor, wherein said processor determines whether said first light source is illuminating said first light sensor and whether said second light source is illuminating said second light sensor, and counting the movement of an object through said light paths based upon said determination.

3. The object counter of claim 2 wherein said processor counts movement of an object through said light paths upon detecting blockage of said first light path, followed by blockage of said second light path, followed by restoration of said light paths.

4. The object counter of claim 1 wherein said light sources generate light pulses, and said processor detects whether at least one of said light sources is illuminating said light sensor based upon the reception, or lack thereof, of said pulses.

5. The object counter of claim 4 wherein said light pulses comprise a pulse generated by said first light source, followed by a pulse generated by said second light source, followed by a pulse generated by said first light source.

6. The object counter of claim 5 wherein said processor detects that light generated by said first light source is illuminating said light sensor based upon the receipt by said sensor of a light pulse followed by a light pulse two pulse widths later.

7. The object counter of claim 5 wherein said processor detects that light generated by said second light source is illuminating said light sensor based upon the receipt by said sensor of a light pulse followed by a light pulse one pulse width later, or based upon the receipt by said sensor of a light pulse not followed by a light pulse two pulse widths later.

8. The object counter of claim 4 wherein said light pulses comprise a long pulse generated by said first light source, and a short pulse generated by said second light source, wherein said processor determines that said first light source is illuminating said sensor based upon the receipt of a light pulse that continues for a time longer than said short pulse, and said processor determines that said second light source is illuminating said sensor based upon the receipt of a light pulse that continues longer than said long pulse, or a light pulse that continues for a time longer than said short pulse but shorter than said long pulse.

9. The object counter of claim 1 wherein said light is infrared light.

10. The object counter of claim 1 further comprising a battery, wherein said light sources, light sensor and processor are powered by said battery.

11. A directional object counter, comprising:

a battery, first and second light sources generating first and second light paths using battery power, at least a first light sensor, using battery power for detecting light from at least one of said light sources after traversing a passageway, said light sensor generating a responsive signal, and a processor connected to said light sensor for receiving said responsive signal, and using battery power, determining whether said at least one light source is or is not illuminating said light sensor solely from the signal from the light sensor, and counting the movement of an object in an identified direction through said light paths based upon said determination.

12. The object counter of claim 11 further comprising a second battery, wherein the first and second light sources use battery power from said first battery, and said first light sensor and said processor use battery power from said second battery.

13. The object counter of claim 11 further comprising a second light sensor, wherein said processor determines whether said first light source is illuminating said first light sensor and whether said second light source is illuminating said second light sensor, and counts the movement of an object through said light paths based upon said determination.

14. The object counter of claim 1 wherein said processor counts movement of an object through said light paths upon detecting blockage of said first light path, followed by blockage of said second light path, followed by restoration of said light paths.

15. The object counter of claim 11 wherein said light sources generate light pulses, and said processor detects whether at least one of said light sources is illuminating said light sensor based upon the reception, or lack thereof, of said pulses.

16. The object counter of claim 15 wherein said light pulses comprise a pulse generated by said first light source, followed by a pulse generated by said second light source, followed by a pulse generated by said first light source.

17. The object counter of claim 16 wherein said processor detects that light generated by said first light source is illuminating said light sensor based upon the receipt by said sensor of a light pulse followed by a light pulse two pulse widths later.

18. The object counter of claim 16 wherein said processor detects that light generated by said second light source is illuminating said light sensor based upon the receipt by said sensor of a light pulse followed by a light pulse one pulse width later, or based upon the receipt by said sensor of a light pulse not followed by a light pulse two pulse widths later.

19. The object counter of claim 15 wherein said light pulses comprise a long pulse generated by said first light source, and a short pulse generated by said second light source, wherein said processor determines that said first light source is illuminating said sensor based upon the receipt of a light pulse that continues for a time longer than said short pulse, and said processor determines that said second light source is illuminating said sensor based upon the receipt of a light pulse that continues longer than said long pulse, or a light pulse that continues for a time longer than said short pulse but shorter than said long pulse.

20. The object counter of claim 11 wherein said light is infrared light.

21. A directional object counter for detecting the movement of objects through a passageway, comprising:

first and second light sources generating first and second light paths carrying different transmitted signals, positioned on a first side of a passageway, at least a first light sensor positioned on a second side of said passageway opposite to said first side, detecting light from at least one of said light sources after traversing said passageway, said light sensor generating a responsive signal, and a processor connected to said light sensor for receiving said responsive signal, and no other signal input relating to said light sources, and determining from the differences in the transmitted signals as received by the light sensor whether said at least one light source is or is not illuminating said light sensor, and counting the movement of an object in an identified direction through said light paths based upon said determination.

22. The object counter of claim 21 further comprising a second light sensor, wherein said processor determines whether said first light source is illuminating said first light sensor and whether said second light source is illuminating said second light sensor, and counts the movement of an object through said light paths based upon said determination.

23. The object counter of claim 21 wherein said processor counts movement of an object through said light paths upon detecting blockage of said first light path, followed by blockage of said second light path, followed by restoration of said light paths.

24. The object counter of claim 21 wherein said light sources generate light pulses, and said processor detects whether at least one of said light sources is illuminating said light sensor based upon the reception, or lack thereof, of said pulses.

25. The object counter of claim 24 wherein said light pulses comprise a pulse generated by said first light source, followed by a pulse generated by said second light source, followed by a pulse generated by said first light source.

26. The object counter of claim 25 wherein said processor detects that light generated by said first light source is illuminating said light sensor based upon the receipt by said sensor of a light pulse followed by a light pulse two pulse widths later.

27. The object counter of claim 25 wherein said processor detects that light generated by said second light source is illuminating said light sensor based upon the receipt by said sensor of a light pulse followed by a light pulse one pulse width later, or based upon the receipt by said sensor of a light pulse not followed by a light pulse two pulse widths later.

28. The object counter of claim 24 wherein said light pulses comprise a long pulse generated by said first light source, and a short pulse generated by said second light source wherein said processor determines that said first light source is illuminating said sensor based upon the receipt of a light pulse that continues for a time longer than said short pulse, and said processor determines that said second light source is illuminating said sensor based upon the receipt of a light pulse that continues longer than said long pulse, or a light pulse that continues for a time longer than said short pulse but shorter than said long pulse.

29. The object counter of claim 21 wherein said light is infrared light.

* * * * *